Figure 1:
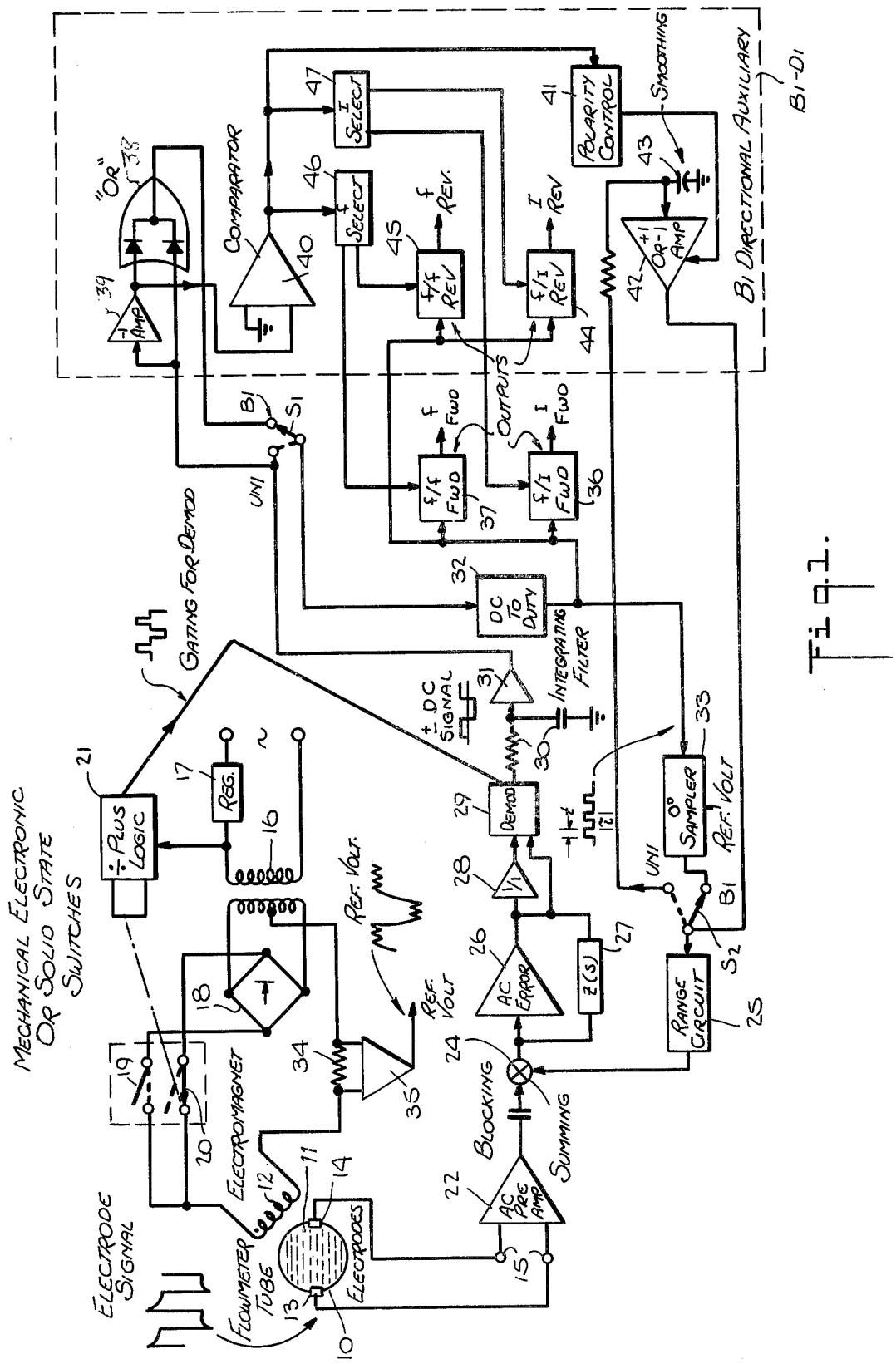

United States Patent [19]

Shauger et al.

[11] 4,167,871
[45] Sep. 18, 1979

[54] BI-DIRECTIONAL ELECTROMAGNETIC FLOWMETER

[75] Inventors: Herbert Shauger, Willow Grove; Roy Schmoock, Richboro, both of Pa.

[73] Assignee: Fischer & Porter Co., Warminster, Pa.

[21] Appl. No.: 911,786

[22] Filed: Jun. 2, 1978

[51] Int. Cl.² ............................................. G01F 1/58
[52] U.S. Cl. ............................................. 73/194 EM
[58] Field of Search ................................... 73/194 EM

[56] References Cited

U.S. PATENT DOCUMENTS

| 3,783,687 | 1/1974 | Mannherz et al. | 73/194 EM |
| 4,089,219 | 5/1978 | Suzuki | 73/194 EM |

Primary Examiner—Charles A. Ruehl
Attorney, Agent, or Firm—Michael Ebert

[57] ABSTRACT

An electromagnetic flowmeter capable of accurately measuring the flow rate of fluid conveyed on a line in either direction. The flowmeter includes a primary whose flow tube is provided with electrodes yielding a signal depending on the flow rate of the fluid intersecting a magnetic field established in the tube, the sense of the signal changing with the direction of flow. This electrode signal is applied to a secondary in which the electrode signal is converted by demodulator means into a d-c signal whose magnitude is a function of flow rate and whose polarity depends on the sense of the electrode signal. This d-c signal is converted into variable-frequency pulses which exhibit a duty cycle proportional thereto, the pulses being sampled and fed back through a feedback loop to one input of a summing junction to which the electrode signal is also applied as another input, the ouptut of the junction being fed to the demodulator means. Associated with the feedback loop is a bi-directional auxiliary which detects the polarity of the d-c signal and acts to apply the sampled duty cycle pulses to the summing junction in the same phase, regardless of the polarity of the d-c signal, whereby the output signals derived from the d-c-to-duty-cycle circuit is indicative of flow rate in either direction of flow.

10 Claims, 6 Drawing Figures

BI-DIRECTIONAL ELECTROMAGNETIC FLOWMETER

BACKGROUND OF INVENTION

This invention relates generally to electromagnetic flowmeters, and more particularly to a bi-directional flowmeter capable of accurately measuring the flow rate of a fluid flowing in a line in either direction, the measurement being immune to changes in fluid conductivity, viscosity and density.

An electromagnetic flowmeter is a volumetric fluid flow rate device utilizing the characteristics of a metered conductive fluid to produce an induced voltage when flowing through a magnetic field. The operation of the meter is based on Faraday's Law of Induction which states that the voltage induced across a conductor as it moves at right angles through a magnetic field is proportional to the velocity thereof.

In the flowmeter, the fluid to be measured is conducted through a flow tube having a pair of electrodes mounted therein at diametrically-opposed points, a magnetic field being generated by an excitation winding in a plane perpendicular to the longitudinal axis of the tube, which plane includes the transverse axis common to the electrodes. If one considers a segment of the metered fluid as a conductor whose length D is equal to the diameter of the pipe, then as the fluid conductor moves at a velocity V through a magnetic field B, the voltage E induced across this conductor in the plane of the meter electrodes will be proportional to the rate of fluid flow.

This may be expressed mathematically by the following equation:

$$E=(1/C)BDV,$$

where C is a dimensionless constant.

By providing a magnetic field B of high strength, a favorable signal-to-noise ratio is obtainable in the output of the flowmeter. The reason for this will be evident from the foregoing equation, in that for a given fluid velocity V, an increase in the strength of the magnetic field B will give rise to an increase in the induced voltage E. The polarity of the flow signal will depend on flow direction, the polarity reversing when the direction of flow reverses. If the electromagnet is energized by an a-c source, the phase of the signal will change by 180° C. during a reverse flow condition.

In the Schmoock U.S. Pat. Nos. 3,260,109 and 3,254,243, there are disclosed electromagnetic flowmeters whose electrode signals are applied to converters which include a feedback loop producing a frequency output proportional to flow rate, the feedback loop being intended to suppress spurious in-phase and quadrature components generated as a result of capacitive and inductive couplings between the magnet coil and the electrode loop.

An improved form of converter for an electromagnetic flowmeter is disclosed in the Mannherz et al. U.S. Pat. No. 3,783,687 whose entire disclosure is incorporated herein by reference.

As pointed out in the Mannherz et al. patent, the magnetic field may be either direct or alternating in nature, for in either event the amplitude of voltage induced in the liquid passing through the field will be a function of its flow rate. However, when operating with direct magnetic flux, the d-c signal current flowing through the liquid acts to polarize the elecrodes, the magnitude of polarization being proportional to the time integral of the polarization current. With alternating magnetic flux operation, polarization is rendered negligible, for the resultant signal current is alternating and therefore its integral does not build up with time.

Though a-c operation is clearly advantageous in that polarization is obviated and the a-c flow-induced signal may be more easily amplified, it has distinct drawbacks. The use of an alternating flux introduces spurious voltages that are unrelated to flow rate and, if untreated, give rise to inaccurate indications. The two spurious voltages that are most troublsome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the a-c flow-induced voltage. Actual tests have indicated that this is not true, in that a component exists in-phase with the flow induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltages both with respect to phase and magnitude.

Hence, it becomes necessary periodically to manually re-zero the meter to correct for the effects on zero by the above-described phenomena.

All of the adverse effects encountered in A-C operation of electromagnetic flowmeters can be attributed to the rate of change of the flux field ($d\phi/dt$), serving to induce unwanted signals in the pick-up loop. If, therefore, the rate of change in the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition ($d\phi/dt$)=0 is satisfied. But d-c operation to create a steady state field is not acceptable, for galvanic potentials are produced and polarization is encountered, as previously explained. Hence in the Mannherz et al. flowmeter, in order to obtain the positive benefits of a steady state field without the drawbacks which accompany continuous d-c operation, the steady state flux field is periodically reversed or interrupted.

In the Mannherz et al. flowmeter, the excitation current for the electromagnet in the flowmeter primary is a low-frequency "square wave equivalent" serving to produce a periodically-reversed steady state flux field whereby unwanted in-phase and quadrature components are minimized without giving rise to polarization and galvanic effects. Because switching transients are developed at the points of polarity reversal, the steady state condition of the flux field is disturbed at these points. A significant feature of the Mannherz et al. flowmeter is that flow-measurement is taken in the secondary associated with the flowmeter primary only in the intervals when the flux achieves a steady state condition, the unsteady state transients being effectively blocked out.

As pointed out in the copending patent application Ser. No. 745,862 of Suzuki, filed Nov. 29, 1976, entitled "Bi-Directional Output Electromagnetic Flowmeter" (now U.S. Pat. No. 4,089,219 ), a disadvantage of existing types of signal converters for electromagnetic flowmeters is that the converter is operable only when the fluid being metered flows in a given direction, for it does not respond when the input signal applied to the converter from the primary results from flow in the reverse direction.

In certain practical applications, the need exists for a magnetic flowmeter having bi-directional characteristics. Thus in service water systems in which the same supply pipe is used to receive and to deliver service water, one requires a bi-directional flowmeter to indicate flow rate in either direction.

To render a magnetic flowmeter bi-directional, Suzuki provides a polarity detector adapted to sense the direction of flow in the line. The detector operates in conjunction with an input signal inverter and a switch actuated by the detector output to select either the inverted or the non-inverted input signal so that the input signal applied to the converter is always in the same direction, and an output signal is yielded at all times regardless of the direction of flow.

Thus Suzuki renders a flowmeter bi-directional by reversing the sense of the input signal representing flow in the reverse direction whereby the input to the converter is always in the same polarity. The drawback to the Suzuki arrangement is that signal reversal at the converter input can give rise to the injection of unwanted offset voltages in the converter, in that the signal levels at this point are at the millivolt level where they may be substantially affected by microvolt offsets. These offsets are virtually impossible to remove even from a well designed printed circuit board.

Another problem encountered when using input signal reversal is that the outputs of the various amplification stages in the converter may contain d-c offset voltages inherent in the amplifiers themselves. This is especially true in the approach taken by Mannherz et al. where the low frequency signals must be decoupled between stages to preserve their integrity. When such a signal is reversed, both the a-c and d-c components are reversed and the resulting d-c will cause a unit step to propagate through the feedback loop, generating a substantial "bump" in the output which constitutes an erroneous flow reading.

SUMMARY OF INVENTION

In view of the foregoing, the main object of this invention is to provide an electromagnetic flowmeter which is capable of accurately measuring the flow rate of fluid in either direction, the measurement being substantially independent of changes in fluid conductivity, viscosity and density.

More particularly, it is an object of this invention to provide a low-frequency bi-directional electromagnetic flowmeter, which meter makes use of a single primary element operating in conjunction with a single signal secondary or converter to which the signal from the primary is applied as an input in a sense depending on the flow direction.

Also an object of this invention is to provide a bi-directional flow measurement system which yields independent current and frequency output signals proportional to flow rate for either direction of flow.

A significant advantage of a bi-directional flowmeter in accordance with the invention is that a change in flow direction produces a reversal in the relatively high level feedback signal in the converter, at which level d-c offset microvolt a-c flow signal errors are of little consequence in the feedback loop, whereby the system is inherently highly accurate. And because feedback is reversed at a high signal level and induced offsets are not a consideration, it becomes feasible to use solid-state circuitry throughout the entire secondary.

Moreover, since the sense of the input signal is never reversed in a bi-directional system in accordance with the invention, its sense is always passed directly through the error amplifiers, demodulators and d-c amplifier in the converter where detection of its direction is not only accomplished at a signal level of several volts, but where information respecting the direction of flow is available continuously, thereby eliminating the need for anti-lock-up circuits or other expedients adapted to bump the converter out of ambiguous conditions.

While the invention will be explained in connection with a low-frequency magnetic flowmeter system of the type disclosed by Mannherz et al., it is applicable to any synchronous closed loop system using a constant pulse width frequency output to ratio a flux-derived reference feedback signal against the electrode signal input. A bi-directional system in accordance with the invention preserves the inherent accuracy of flow totalization and the ease of isolating both the current outputs and total flow outputs from the measuring circuit common.

Briefly stated, bi-direction electromagnetic flowmeter in accordance with the invention is constituted by a flowmeter primary including a flow tube having a pair of electrodes mounted at diametrically-opposed positions and an electromagnetic coil excited by a d-c voltage that is periodically interrupted at a low-frequency rate to produce a magnetic field in the flow tube, the voltage induced in the fluid passing through the tube and intersecting the field being transferred to the electrodes to produce a flow-induced signal whose sense changes with the direction of flow.

The secondary or converter of the flowmeter includes demodulator means to convert the flow-induced electrode signal into a d-c signal whose magnitude and polarity are a function of flow rate and whose polarity depends on the sense of the electrode signal. The d-c signal is translated by a d-c-to-duty cycle circuit into variable frequency pulses which exhibit a duty cycle proportional thereto, these variable duty pulses being sampled and fed back through a feedback loop to one input of a summing junction to which the electrode signal is also applied as a second input, the output of the junction being fed to the demodulator means.

Associated with the feedback loop of the converter is a bi-directional auxiliary which detects the polarity of the d-c signal and acts to apply the sampled duty cycle pulses to the input junction in the proper phase regardless of the polarity of the d-c signal, whereby the output signals derived from the d-c-to-duty cycle circuit is indicative of flow rate in either direction of flow.

OUTLINE OF THE DRAWINGS

For a better understanding of the invention as well as other objects and further features thereof, reference is made to the following detailed description to be read in conjunction with the accompanying drawings wherein:

FIG. 1 is a block diagram of a bi-directional electromagnetic flowmeter system in accordance with the invention; and FIGS. 2A to E are waveforms representing voltages or currents generated at various points in the system.

DESCRIPTION OF INVENTION

The Primary:

Referring now to FIG. 1, there is shown a bi-directional flowmeter system in accordance with the invention whose primary produces a low-level a-c signal output having an amplitude proportional to the flow rate of the liquid being measured, and whose secondary converts this low level a-c signal to a proportional d-c current output signal.

In addition to the analog d-c current output, the secondary also yields a pulse output whose frequency is proportional to flow rate, the pulse output being useful in operating digital registers, counters or batch control systems. By means of proper scale factoring, registry of total accumulated flow may be integrated from this rate signal.

The flowmeter primary includes a flow tube 10 through which the liquid 11 to be measured is conducted. An electromagnet having a coil 12 is provided to establish a magnetic field transverse to the direction of flow, the flow being parallel to the longitudinal axis of the tube. Electrodes 13 and 14 in contact with the flowing fluid are disposed at diametrically-opposed points on the flow tube along an axis which is perpendicular both to the longitudinal direction of flow and the transverse magnetic field.

A voltage is induced in the liquid whose flow intersects the magnetic field, this voltage being transferred to the electrodes to produce a signal at the flowmeter output terminals 15 that reflects the flow rate. This signal is referred to as the flow-induced signal to distinguish it from spurious signal components that are independent of flow rate.

Excitation coil 12 is energized by a relatively low-frequency square wave derived from a full-wave rectifier power supply constituted by a transformer 16 whose primary is connected to an a-c power line through a regulator 17. This line supplies the usual 50 or 60 Hz current. The secondary of transformer 16 is connected to the input junctions of a full-wave rectifier bridge 18 whose output junctions are connected to the respective movable contacts of two single-pole, single throw switches 19 and 20. The fixed contacts of these switches are both connected to one end of field coil 12. The other end of the coil is connected to the center tap of the secondary of transformer 16 through a resistor 34.

When switch 19 is closed and switch 20 is simultaneously open, the rectified output is applied to the magnet coil in one polarity, and when switch 19 is open and switch 20 is simultaneously closed, the polarity is reversed. While for purposes of explanation, switches 19 and 20 are shown as mechanical devices, in practice these switches are in electronic form and may be constituted by thyratrons, triacs or any other type of electronic switching device in vacuum tube or solid-state form.

Switches 19 and 20 are activated at a rate which is low relative to the frequency of the a-c line. This is accomplished by means of a presettable scaler or frequency divider 21 to which the 60 Hz line voltage is applied as a clock signal, the scaler yielding low frequency pulses in the order of $1\frac{7}{8}$, $3\frac{3}{4}$, $7\frac{1}{2}$ or 15 Hz.

The low-frequency pulses from the scaler are applied to the firing electrodes of the two triac switches (or whatever other electronic switching devices are used) to alternately turn on the triacs and thereby connect either the positive or the negative side of the full-wave rectified 60 Hz voltage to the magnet coil. Thus when switch 19 is closed, current flows through the magnet coil in one direction, and when switch 20 is closed, the current flows in the reverse direction.

Figure 2:
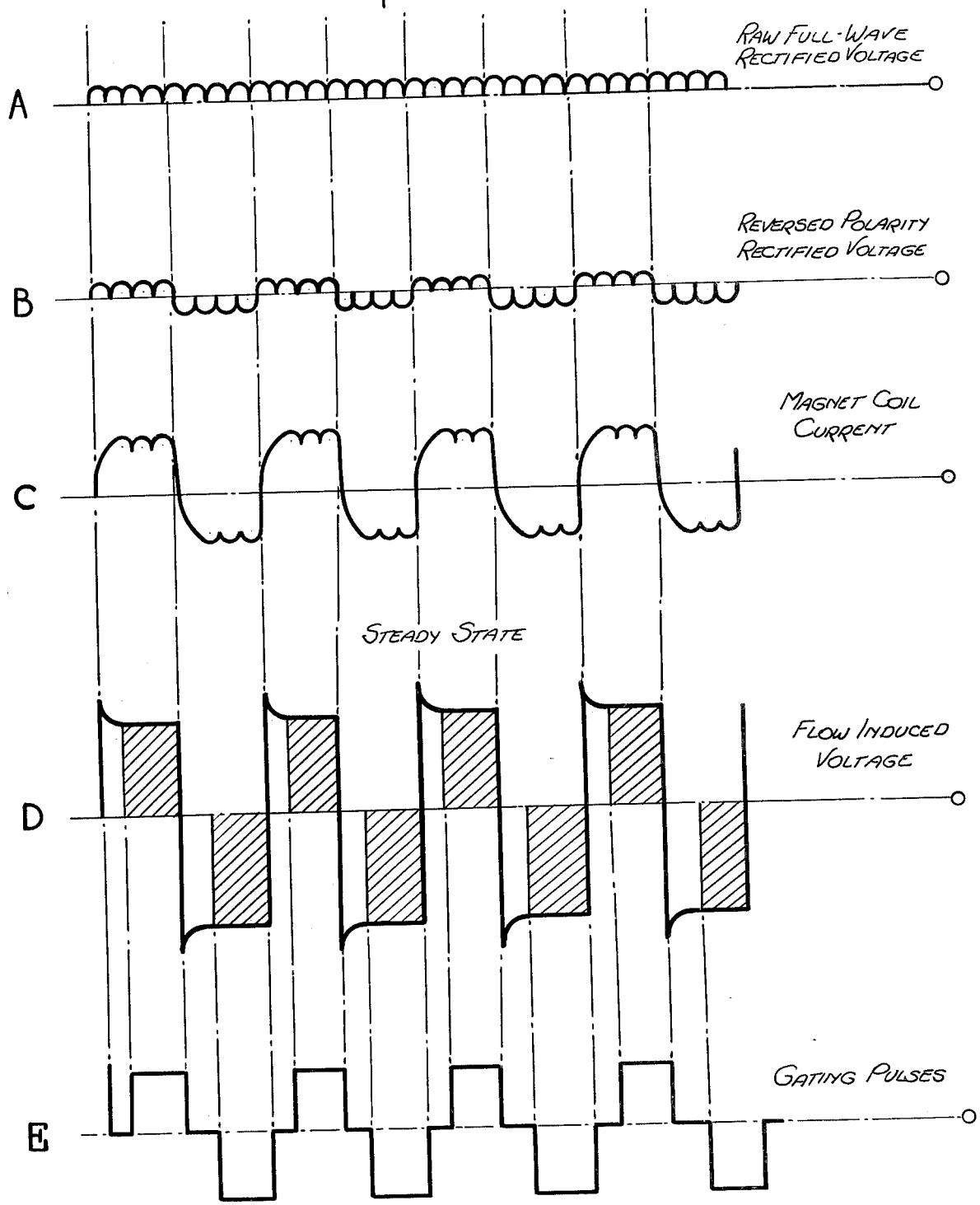

Because the output of the full-wave rectifier is a raw, unfiltered direct voltage, it is composed, as shown in FIG. 2A, by a continuous train of half-cycle pulses, all of the same polarity. But with the low-frequency switching action, the voltage applied to magnet coil 12 is periodically reversed in polarity, as shown in FIG. 2B, as a result of which the current passing through the coil has the form shown in FIG. 2C, in which the current has a 120 Hz ripple component.

Because the electromagnet has a relatively high inductance, it functions as a filter choke and, in practice, it takes out as much as 75 percent component. The remaining portion of the 120 Hz ripple component that appears in the flow-induced signal is smoothed out at the summing junction of the secondary via the filter action of the associated error amplifier, to be later described. This obviates the need for filter capacitors associated with the choke, as in conventional filters. Thus, the system functions as if it were excited by a "square wave equivalent" having a substantially constant amplitude.

The flow induced signal appearing at output terminal 15 of the flowmeter primary is fed to a secondary or converter. This converter is essentially an all solid-state a-c feedback system producing an output whose frequency is proportional to flow rate.

The Converter:

In the converter shown in FIG. 1, the flow-induced signal appearing at output terminals 15 of the flowmeter is applied to the first stage of the converter which is an a-c pre-amplifier 22. This signal has the shape shown in FIG. 2D, where it will be seen that the signal has a generally square-wave formation but for the spikes appearing at the points of polarity reversal. These spikes are the result of switching transients or surges, and have a duration depending on the inductance-resistance time constant of the electromagnetic circuit.

The constant level portion of the square wave, as indicated by cross-hatching, reflects the steady state condition of the magnetic field, and has an amplitude that is directly proportional to the velocity of liquid passing through the flow tube. Hence it is only this portion of the signal which is of interest for accurate measurement purposes.

The output of pre-amplifier 22 is applied through a blocking capacitor to one input of a summing junction 24 to whose other input is fed the output of a range attenuation circuit 25 from an error signal type of feedback loop. The error signal produced by a comparison of the flow signal and the feedback signal in the summing junction is amplified in a-c error amplifier 26. This amplifier is provided with a sub-negative feedback circuit 27 adapted to attenuate all frequencies lower and higher than that of the error signal.

The a-c output of error amplifier 26 is applied to an inverting 1:1 amplifier 28, whose output in conjunction with that of error amplifier 26 is applied to a full-wave demodulator 29. The operation of the demodulator is synchronized with the low-frequency switching rate of the magnet coil and is so gated as to block the applied error signal at those points corresponding to the point of polarity reversal, the blockage being maintained for the duration of the inductance-resistance time constant of the electromagnetic circuit. In this way, the d-c output of the demodulator reflects only the steady state magnetic flux condition, the spiked portions of the flow-induced signal being suppressed.

In order to so synchronize the demodulator, the frequency divider 21 which responds to the 50 to 60 cycle signal to produce low-frequency control pulses for governing the electromagnetic switching action is provided with suitable logic to produce gating pulses at the same low-frequency rate. These gating pulses, as shown in FIG. 2E, are coincident with the hatched portion (steady state) of the flow-induced signal shown in FIG. 2D. Thus the demodulator is activated only during the steady state intervals and is otherwise blocked. As a consequence, the secondary only looks at the flow-induced signal during the period that $d\phi/dt$ is equal to zero. The d-c output pulses produced by demodulator 29 are applied to a resistance-capacitance integrating circuit 30 to produce a direct-voltage error signal whose magnitude is a function of flow rate. This error signal is applied to a direct-current amplifier 31 whose output is used as a control bias for a d-c-to-frequency generator 32 that, in practice, may take the form of a blocking oscillator.

Amplifier 31 is connected to frequency generator 32 through a switch $S_1$ which is positioned to engage contact UNI for operation of the flowmeter for unidirectional flow measurement. Switch $S_1$ is shifted to engage contact BI to operate bi-directionally.

Blocking oscillator 32 translates the d-c error signal level to a variable-frequency pulse train which exhibits a duty cycle that is proportional to the error signal. (Duty cycle is defined as the pulse width or on-time interval (t) divided by the total period (T).) This variable duty cycle error signal is used to drive the output circuits of the system as well as serving as the take-off point for the error signal feedback circuit.

For purposes of feedback, the variable duty cycle error signal must first be restored to a proportional low-frequency signal (i.e., $1\frac{7}{8}$ HZ or whatever low frequency is in effect). This is accomplished by means of a sampling circuit 33 coupled to the d-c-to-duty cycle generator 32 and acting to sample an in-phase reference voltage derived from the electromagnetic circuit. This reference voltage is generated by fractional-ohm resistor 34 which is interposed between magnet coil 12 and the center tap of the secondary transformer 16, the voltage drop thereacross depending on current flow through the magnet coil. This voltage is applied to an operational amplifier 35 to produce a reference voltage at its proper level.

The output of sampler 33 is constituted by the duty-cycle pulses derived from the d-c-to-frequency generator modulated by the low frequency square wave reference voltage RV. When the flowmeter operates for unidirectional flow measurement, the output of sampler 33 is fed through contact 1 of a switch $S_2$ to summing junction 24 through the range attenuator 25. Inasmuch as this feedback signal depends on the amplitude of the refererence voltage, any variation in the voltage as a result of line fluctuations will proportionately change the feedback signal. Since it is the ratio of the flow-induced signal to the feedback signal that constitutes the measurement criterion, no loss of accuracy will be experienced with variations in line voltage (within reasonable limits).

The signal from the d-c-to-duty cycle generator 32 is applied to a duty cycle-to-d-c converter 36, which converts the pulses of the former into an analog d-c output that is proportional to fluid flow rate. The signal from the d-c-to-duty-cycle generator is also applied to a pulse scaler 37 which converts the applied pulses into engineering units which are available to drive an external counter.

The Bi-Directional Auxiliary:

The secondary illustrated in FIG. 1 acts to modify the a-c electrode signal from the primary of the flowmeter and to apply it to summing junction 24 where it is summed against a feedback signal derived from the reference voltage source 35 that reflects fluctuations in the excitation current in the primary as well as an output frequency having both a period of T seconds and a constant pulse width of t seconds. The output of range circuit 25 in the feedback loop is a signal opposite in phase but equal in magnitude to the amplified electrode signal. This range signal $V_{range}$ is defined by the equation:

$$V_{range} = \pm V_{ref} X k X (t/T)$$

The frequency of the feedback signal may be in the range of 0 to 1/T Hz and is directly proportional to flow rate. The phase of voltage $V_{ref}$ applied to the range circuit is determined by the bi-directional auxiliary designated Bi-Di which is enclosed in the dashed-line block in FIG. 1.

In the converter, an error signal at the summing junction is amplified, synchronously demodulated and applied to d-c amplifier 31. Only the valid portion of the output wave of error amplifier 26 is demodulated, in that the leading portion of the wave is developed before the magnetic flux attains a steady state condition, as indicated in FIG. 2D.

The bi-directional auxiliary is rendered operative when switch $S_1$ is shifted to fixed contact BI to put the converter in the bi-directional mode. The output of d-c amplifier 31 is then inverted and a diode OR gate 38 feeds whichever output is positive to the d-c-to-duty cycle generator 32 and onto the 0° sampler 33.

The d-c signal present in the output of amplifier 31 may be either positive or negative in polarity, depending on the direction of flow of the fluid being metered. This d-c signal is applied to OR 38 directly to one diode therein and through an inverting amplifier 39 to the other diode therein, so that the pair of diodes which are connected to both the incoming d-c signal and its compliment directs only that signal which is positive into the d-c-to-duty cycle generator 32. This action is essential in that such generators are generally uni-polar devices. Thus generator 32 operates in response to any non-zero d-c signal present in the feedback loop.

The output of inverting amplifier 39 is also applied to an analog comparator 40 whose output actuates a polarity control circuit 41. Polarity control circuit 41 commands an amplifier 42 to whose input is applied the output of sampler 33 whose output is applied to range circuit 25 when switch S$_2$ is shifted to engage fixed contact BI to put the converter in the bi-directional mode. Amplifier 42 is capable of yielding either a true or an inverted output rendition of its input signal.

The input signal applied to amplifier 42 is the reference voltage from reference voltage amplifier 35 attenuated by sampler 33, this input signal being smoothed by capacitor 43 in the input circuit of amplifier 42. The output of amplifier 42 which is applied to range circuit 25 is therefore proportional to the flow rate and is out of phase with the electrode signal for either direction of flow.

In short, the bi-directional auxiliary Bi-Di coupled to the feedback loop of the secondary detects the polarity of the d-c signal and causes the feedback that is applied by range circuit 25 to summing junction 24 to be always out of phase with the electrode signal applied to the same junction regardless of the direction of flow.

In order to provide separate current and frequency outputs for either flow direction, the bi-directional auxiliary includes a duty cycle-to-d-c converter 44 and a pulse scaler 45, both of which are coupled to the d-c-to-duty cycle generator 32 in the feedback loop. Devices 44 and 45 serve to provide outputs for flow in the reverse direction, while the corresponding devices 36 and 37 act to provide outputs for flow in the forward direction.

In order to render devices 36 and 37 operative only when the flow being metered is in the forward direction and to render devices 44 and 45 operative only when the flow is in the reverse direction, the output of comparator 40 is also applied to a frequency selector 46 and to a current selector 47. Selector 46 is operatively coupled to the forward and reverse flow frequency output devices 37 and 45, and selector 47 is operatively coupled to forward and reverse flow current output devices 36 and 44, so that those outputs which represent the flow direction opposed to the flow direction actually present are inhibited (i.e., current goes to zero and a totalizing counter is arrested).

While there has been shown and described a preferred embodiment of a bi-directional electromagnetic flowmeter in accordance with the invention, it will be appreciated that many changes and modifications may be made therein without, however, departing from the essential spirit thereof.

We claim:

1. An electromagnetic flowmeter capable of measuring the flow rate of a fluid conducted through a line in either direction, said flowmeter comprising:
   A. a primary including a flow tube through which the fluid to be metered flows in either direction to intersect a magnetic field produced by a periodically-energized excitation coil, thereby inducing in a pair of tube electrodes an electrode signal whose sense depends on the flow direction;
   B. a secondary including means to convert the electrode signal into a d-c signal whose magnitude is a function of flow rate and whose polarity depends on the sense of the electrode signal, a generator converting the d-c signal into variable frequency pulses which exhibit a duty cycle proportional thereto, and a feedback loop to supply said pulses to a summing junction to which is also applied the electrode signal; and
   C. a bi-directional auxiliary associated with the feedback loop to detect the polarity of the d-c signal and to apply the pulses to the summing junction in opposition to the phase of the electrode signal regardless of the polarity of the d-c signal, whereby output signals derived from the generator are indicative of the flow rate in either direction of flow.

2. A flowmeter as set forth in claim 1, wherein said excitation coil is energized by a periodically-interrupted direct voltage power or by periodically-reversed direct voltage power.

3. A flowmeter as set forth in claim 1, wherein said means to convert the electrode signal into a d-c signal includes a demodulator whose output is integrated and applied to an amplifier.

4. A flowmeter as set forth in claim 3, wherein said bi-directional auxiliary includes an OR gate coupled to said amplifier through an inverter to feed whichever output of the amplifier is positive to said generator.

5. A flowmeter as set forth in claim 4, wherein the output of said OR gate is applied to a comparator whose output actuates a polarity control circuit adapted to control the phase of the pulses applied by the generator to the summing junction.

6. A flowmeter as set forth in claim 5, further including a pair of duty cycle-to-d-c converters coupled to said pulse generator to produce an output whose frequency depends on flow rate, and a selector responsive to the output of said comparator and coupled to said pair of converters to render one of said converters operative to indicate flow rate in one direction and the other operative to indicate flow rate in the reverse direction.

7. A flowmeter as set forth in claim 5, further including a pair of frequency-to-current converters coupled to said pulse generator to produce a current whose intensity depends on flow rate, and a selector responsive to the output of said comparator and coupled to said pair of converters to render one of said converters operative to indicate flow rate in one direction and the other operation to indicate flow rate in the reverse direction.

8. A flowmeter as set forth in claim 1, wherein said pulses from said generator are applied in said feedback loop to said summing junction through a zero-degree sampler.

9. A flowmeter as set forth in claim 8, wherein said sampler output is fed to said summing junction through a range circuit.

10. A flowmeter as set forth in claim 1, further including means in said primary to derive a reference voltage that reflects fluctuations in the excitation current applied to said coil, and means to apply said reference voltage to said sampler to modulate the signal applied to the summing junction.

* * * * *